United States Patent
Perrier et al.

(10) Patent No.: US 9,135,716 B2
(45) Date of Patent: Sep. 15, 2015

(54) METHOD FOR ESTIMATING THE MOVEMENT OF A TRAVELING OBSERVATION INSTRUMENT FLYING OVER A CELESTIAL BODY

(75) Inventors: Régis Perrier, Saint Martin d'Heres (FR); Mathias Ortner, Toulouse (FR); Elise Arnaud, Montbonnot (FR); Peter Sturm, Montbonnot (FR)

(73) Assignee: AIRBUS DEFENCE AND SPACE SAS, Les Mureaux (FR)

(*) Notice: Subject to any disclaimer, the term of this patent is extended or adjusted under 35 U.S.C. 154(b) by 572 days.

(21) Appl. No.: 13/510,671

(22) PCT Filed: Nov. 12, 2010

(86) PCT No.: PCT/EP2010/067353
§ 371 (c)(1),
(2), (4) Date: Aug. 28, 2012

(87) PCT Pub. No.: WO2011/061123
PCT Pub. Date: May 26, 2011

(65) Prior Publication Data
US 2012/0308084 A1 Dec. 6, 2012

(30) Foreign Application Priority Data

Nov. 19, 2009 (FR) ..................... 09 58195
May 10, 2010 (FR) ..................... 10 53632

(51) Int. Cl.
*G06T 7/20* (2006.01)
(52) U.S. Cl.
CPC ......... *G06T 7/20* (2013.01); *G06T 2207/10036* (2013.01); *G06T 2207/10041* (2013.01); *G06T 2207/30181* (2013.01)

(58) Field of Classification Search
None
See application file for complete search history.

(56) References Cited

U.S. PATENT DOCUMENTS

2008/0031528 A1* 2/2008 Crombez et al. .............. 382/232

OTHER PUBLICATIONS

Szeliski, Richard. "Image alignment and stitching: a tutorial." Foundations and Trends® in Computer Graphics and Vision 2.1 (2006): 1-104.*
Autoregressive model, Wikipedia: the freee encyclopedia, article revision dated Nov. 11, 2008.*

* cited by examiner

Primary Examiner — Bhavesh Mehta
Assistant Examiner — Raphael Schwartz
(74) Attorney, Agent, or Firm — Young & Thompson

(57) ABSTRACT

Method for estimating the movement of an observation instrument on-board a vehicle flying over a celestial body, the instrument including at least two strips with different lines of sight, each strip realizing the acquisition of successive image lines making up a composite image, parts of the composite images representing substantially a same scene of the celestial body. The estimated movement is determined by optimization of an image similarity function that associates, to a given movement hypothesis, a similarity between values of matched pixels of at least a pair of composite images. The method includes, for each movement hypothesis considered during the optimization: determining, for the at least one pair of composite images, at least one spatio-temporal transformation using the considered movement hypothesis and a geometric model of the observation instrument, and matching the pixels of the at least one pair of composite images using the at least one spatio-temporal transformation.

20 Claims, 4 Drawing Sheets

Figure 1:
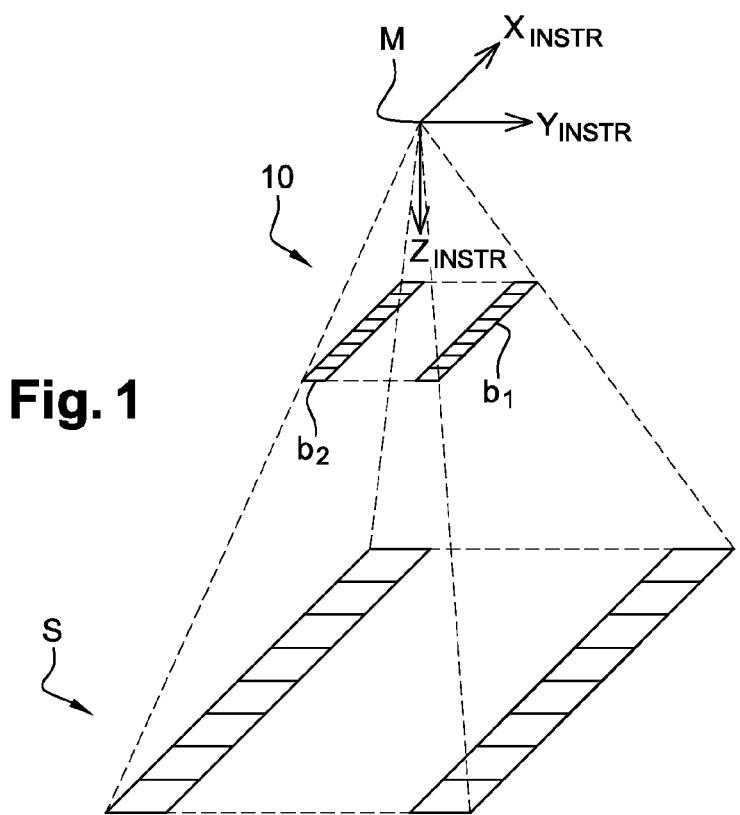

METHOD FOR ESTIMATING THE MOVEMENT OF A TRAVELING OBSERVATION INSTRUMENT FLYING OVER A CELESTIAL BODY

BACKGROUND OF THE INVENTION

1. Field of the Invention

This invention belongs to the field of using images obtained by at least two strips of a scanning observation instrument mounted on board a vehicle (airplane, drone, helicopter, satellite, etc.) flying over a celestial body, such as the Earth.

2. Description of the Related Art

A strip of a scanning instrument comprises a plurality of sensitive cells (typically from 100 to 100,000) generally arranged in line and possibly on several lines. The line of sight of the strip is pointed toward the Earth's surface, and forms a plane with the line of sensitive cells, called "plane of sight".

The instrument's main line of sight can be defined either as the line of sight of the central pixel of one of the two strips or as the line of sight of the central pixel of a fictitious strip that would be located, for example, at an equal distance from the two strips.

During image capture, each strip acquires successively images rows representing different linear portions of said scene, as its plane of sight scans the observed scene. Each sensitive cell of the strip records in a pixel the luminous intensity, within the wavelength considered, of an area of the linear portion aimed at.

The scanning of the plane of sight of each strip is achieved, for example, by moving the vehicle. This is generally the case for instruments on board a low-orbit satellite.

In general, the acquisition of images rows of a single strip is performed during a fixed time period (duration of acquisition), and with a substantially constant frequency of acquisition.

For a typical spatial application, an observation instrument is on board a satellite in orbit at 500 to 800 kilometers altitude; its line of sight is nominally pointed toward the center of the Earth; the instrument's focal length is between 0.5 and 15 meters, the field of view is between 1 and 20 degrees, each strip comprises a line of 5,000 to 50,000 sensitive cells, the scanning speed is between 6.5 and 6.8 kilometers per second, the acquisition frequency is between 500 and 5,000 Hertz; the swath (length of the linear portion covered by one image line on the Earth's surface) is between 10 and 100 kilometers, the dimension of an area imaged by one pixel is between 0.5 and 20 meters on the Earth's surface. The strips are generally 5 to 50 centimeters apart in the focal plane; the time gap between the image of a point on the earth's surface being captured by the first strip and its image being captured by the second strip is between 0.05 to 5 seconds.

The successive image lines acquired by a single strip form a pixel matrix called "composite image", which represents the scene observed during image capture. It can be seen that, because the image lines are acquired at different times and because of the instrument's movements during image capture, the composite image distributed in a plane according to a regular grid does not represent the scene exactly as it would ideally be seen by an observer overlooking said scene. For example, because of these movements, a perfectly straight road may be curved in the composite image.

In the most general case, during image capture, two different strips will provide two different composite images whose pixels, acquired at a given time, represent different areas of the observed scene. In general, the layout of the strips, e.g. parallel in the focal plane of the observation instrument, is such that these composite images have a large amount of spatial overlap when the vehicle travels above the scene to be observed.

The differences between the two composite images are due to the fact that the lines of sight associated with the two strips are different. As a result, the composite images do not overlap completely at the beginning and the end of image capture. But the differences between the two composite images are mainly due to the movements of the instrument, since they can affect, at any given instant, different pixels in each composite image, specifically because of the gap between the two strips' lines of sight.

From patent FR 2 899 344, a method is known for reconstructing the line of sight, in which homologous characteristic areas between the composite images of a single scene acquired by two different strips are determined by correlation, and the angular variations of the line of sight are reconstructed according to the geometric distances between the positions (i.e. the pixel indices) of the characteristic areas in each of said composite images.

However, this method has many limitations.

For example, the ability to determine, or not, homologous characteristic areas in the two composite images very much depends on the nature of the observed scene. For example, for weakly textured scenes, such as sea/ocean and/or snowy mountain scenes, it will be impossible in practice to determine a sufficient number of homologous characteristic areas to achieve good performance in reconstructing the line of sight.

In addition, the method of patent FR 2 899 344 is sensitive to the effects of parallax and/or to the presence of clouds, which can distort or prevent the correlation of the homologous characteristic areas.

In the method of patent FR 2 899 344, the relative angular variations from one sampling instant to another are the parameters estimated by correlation between the homologous characteristic areas; this requires an additional step of filtering and integration to reconstruct the absolute angular variations, which step may be detrimental in terms of computation complexity.

In addition, the method of patent FR 2 899 344, which is very suitable for a pair of composite images, cannot be easily generalized to processing simultaneously more than two composite images with different time shifts or even different acquisition frequencies.

SUMMARY OF THE INVENTION

The aim of this invention is to provide solutions to all of these limitations by proposing a method for estimating the movement of the observation instrument, capable of using the image lines acquired by all the strips of the observation instrument simultaneously, even when there are three or more of said strips.

Another aim of this invention is to propose an estimation method which is robust even when the observed scene comprises one or several weakly textured areas.

Another aim of this invention is to propose an estimation method capable of taking into account, in addition to composite images provided by the various strips, information supplied in particular by the vehicle's on-board attitude sensors and/or to take into account prior knowledge of certain characteristics of the observation instrument's movements.

This invention relates to a method for estimating the movement of an observation instrument on-board a vehicle flying over a celestial body, the observation instrument comprising at least two strips with different lines of sight, each strip realizing the acquisition of successive image lines making up a composite image, by scanning its line of sight over the celestial body, parts of the composite images representing substantially a same scene of the celestial body. The estimated movement is determined by optimization of an image similarity function that associates, to a given movement hypothesis, a similarity between values of matched pixels of at least a pair of composite images, matched pixels being pixels that represent, theoretically, the same point of the observed scene, given the considered movement hypothesis. The method comprises, for each movement hypothesis considered during the optimization of the image similarity function, the following steps:

determining, for the at least one pair of composite images, at least one spatio-temporal transformation using the considered movement hypothesis and a geometric model of the observation instrument;

matching the pixels of the at least one pair of composite images using the at least one spatio-temporal transformation.

Preferably, the image similarity function is optimized iteratively by iterating the following steps until a stop criterion is satisfied:

determining the at least one spatio-temporal transformation of the at least one pair of composite images using the movement hypothesis of the current iteration;

matching the pixels of the at least one pair of composite images;

computing image data using said matched pixels, for the image similarity function;

updating the movement hypothesis for the next iteration using the image data.

Preferably, the image data comprises at least one gradient of the image similarity function that is representative, around the current iteration's movement hypothesis, of the variation of the similarity between the values of the matched pixels of the at least one pair of composite images.

Preferably, the image similarity function is a function that increases when a distance between the values of two matched pixels decreases and the estimated movement is determined by maximizing the image similarity function.

Preferably, the movement hypothesis is described by the set of attitude angles of the observation instrument at sampled times of the acquisition, the image similarity function is calculated as a function of these angles and the estimated movement is determined as being the set of attitude angles that optimize the image similarity function.

Preferably, the estimated movement is determined by optimization of an external similarity function that associates, to a given movement hypothesis, a similarity between said movement hypothesis and measurements, which are representative of the instrument's movements, made by one or several sensors different from the observation instrument's strips.

Preferably, the external similarity function is optimized iteratively by iterating the following steps until a stop criterion is satisfied:

computing, for the external similarity function, external data using the measurements of the sensor or sensors and the current iteration's movement hypothesis;

updating the movement hypothesis for the next iteration using the external data.

Preferably, the external data comprises at least one gradient of the external similarity function that is representative, around this movement hypothesis, of the variation of the similarity between the current iteration's movement hypothesis and the measurements of the sensor or sensors.

Preferably, the image similarity and external similarity functions are optimized jointly, by optimization of a global function cumulating said image similarity function and said external similarity function.

Preferably, a first estimation of the movement is determined as being the movement hypothesis that optimizes the image similarity function; then, starting from this first movement estimation, a second movement estimation is determined as being the movement hypothesis that optimizes the external similarity function.

Preferably, at least one sensor is a gyroscope or a stellar sensor or an angular sensor of a movable mirror of the observation instrument.

Preferably, the estimated movement is determined using a predefined temporal model of the observation instrument's movement.

Preferably, the estimated movement is determined by optimization of a model similarity function that associates, to a given movement hypothesis, a similarity between said movement hypothesis and the temporal movement model.

Preferably, the method comprises a step of updating the temporal movement model using a movement hypothesis.

Preferably, the model similarity function is optimized iteratively by iterating the following steps until a stop criterion is satisfied:

computing, for the model similarity function, model data using the temporal movement model and the current iteration's movement hypothesis;

updating the movement hypothesis for the next iteration using the model data.

Preferably, the model data comprises at least one gradient of the model similarity function that is representative, around this movement hypothesis, of the variation of the similarity between the current iteration's movement hypothesis and the temporal movement model.

Preferably, the image similarity and model similarity functions are optimized jointly, by optimization of a global function cumulating said image similarity function and said model similarity function.

Preferably, the temporal movement model is a parametric movement model, preferably a model whose basic functions are of polynomial, wavelet, sinusoid, or spline type.

Preferably, the temporal movement model is a probabilistic movement model, preferably an autoregressive-type model.

Preferably, in the image similarity function, matched pixels whose similarity evolves, during optimization, in abnormal fashion in relation to the similarity of the other matched pixels have their contribution reduced.

Preferably, the reduction of the contributions of matched pixels is performed by means of a robust estimation function.

Preferably, the reduction of the contributions of matched pixels is performed by means of at least one weighting matrix and, where the image similarity function is optimized iteratively, the method comprises preferably a step of updating the at least one weighting matrix using the contributions of the matched pixels to said image similarity function.

Preferably, the method is iterated according to a multi-resolution optimization scheme.

BRIEF DESCRIPTION OF THE DRAWING FIGURES

The invention will be better understood in reading the following description of a non-limiting example, made with reference to the figures, which represent:

FIG. 1: a very schematic representation of a traveling observation instrument flying above the Earth, FIGS. 2, 3, 4 and 5: diagrams illustrating particular embodiments of a method according to the invention.

DETAILED DESCRIPTION OF THE INVENTION

This invention relates to a method for estimating the movement of an observation instrument 10 on board a vehicle (airplane, drone, helicopter, satellite, etc.) flying over a celestial body, during image capture. The remainder of the description considers, in a non-limiting way, the case in which the overflown and observed celestial body is the Earth.

The implementation of this method for estimating the movement of the observation instrument 10 is, for example, provided by a computing device (microcontroller, computer with at least one microprocessor, etc.) The computing device comprises storage means (magnetic hard disk, flash memory, optical disk, etc.) in which a computer program product is stored, in the form of a set of program code instructions to be executed so as to implement the steps of the method according to the invention, from the image lines acquired by the observation instrument 10.

According to certain embodiments, the computing device also comprises one or several integrated circuits, of ASIC, FPGA, etc. type, designed to implement all or part of the steps of the method according to the invention.

The computing device can be on-board, with the observation instrument 10, in the vehicle flying over Earth in the case of real-time processing. In the case of deferred processing, the computing device can be either on-board the vehicle with the observation instrument 10, or remote, i.e. located in a ground station or in a second vehicle flying over the Earth.

A) DEFINITIONS AND NOTATIONS

Definitions and notations used in the remainder of the description are given below. It is understood that the choice of a particular convention does not limit the invention, which could be described in equivalent fashion by using other conventions without causing a change in the invention.

A.1) Observation Instrument, Image Lines, Composite Images

An observation instrument 10 is considered, which comprises Nb strips $b_i$, $1 \leq i \leq Nb$. It is assumed for simplicity that each strip comprises the same number K of sensitive cells. The non-limiting case in which the strips $b_i$ are laid out in substantially parallel fashion in the focal plane of the observation instrument 10 is used.

The scanning of the line of sight of each strip $b_i$ makes it possible to acquire image lines successively that correspond to different linear portions of an observed scene S, i.e. parts that are discontinuous or overlap at most partially.

The remainder of the description takes place in the case in which the scanning of a strip's line of sight occurs by movement of the vehicle in relation to the Earth (such an instrument is known as a "push broom").

This is, nevertheless, a non-limiting example of the invention. For example, the scanning of a strip's line of sight can occur by moving said line of sight in relation to the vehicle, using a sweeping mechanism that carries either the strip or a sighting mirror located on the strip's optical path. This may be the case for an observation satellite in geostationary orbit, stabilized in three axes.

For the purpose of simplifying the equations, and in a non-limiting way for the invention, the period of acquisition of images lines, designated by $\Delta T$, is considered to be constant over time and to be the same for all the strips $b_i$.

However, it should be noted that, in the case of the most common applications and in particular for a satellite observation system, a strip operating in a panchromatic band is used, as well as other strips operating within dedicated spectral bands (e.g. green, red, near infrared) and that the panchromatic strip's acquisition frequency is generally four times higher than that of the other strips.

During image capture, N image lines are acquired by each of the strips $b_i$ at the time $(n-1) \cdot \Delta T$, $1 \leq n \leq N$. In this way, each strip $b_i$ acquires a composite image $B_i$ made up of the set $\{B_i(k,n), 1 \leq k \leq K, 1 \leq n \leq N\}$, where $B_i(k,n)$ is the value of the pixel with the index value (k,n).

The k index corresponds to a spatial dimension: the position of the sensitive cell along the strip; the n index represents a temporal dimension: the time of image capture. Hence the name "spatio-temporal grid", which will be associated with the composite image.

To simplify the notations, the acquisition times will be indexed in such a way that the acquisition time for index value n is time $(n-1) \cdot \Delta T$.

During image capture, two different strips will provide two different composite images whose pixels, acquired at a single given time, represent different areas of the observed scene. The layout of the strips at the focal plane of the observation instrument, is such that these composite images have a large amount of spatial overlap when the vehicle travels above the scene to be observed. The method will deal only with that portion of the composite images that correspond to this spatial overlap.

A.2) Instrument Reference Frame

FIG. 1 represents in perspective, very schematically, the overflight of a scene by an observation instrument 10 comprising at least two strips $b_1$, $b_2$, which are considered to be parallel in the focal plane of the instrument.

An instrument reference frame $R_{INSTR}$ is associated to the observation instrument 10; its origin M represents the position of the observation instrument 10 in the vehicle. The instrument reference frame $R_{INSTR}$ comprises three axes $X_{INSTR}$, $Y_{INSTR}$ and $Z_{INSTR}$, which are orthogonal in relation to each other. The $X_{INSTR}$ axis is parallel to the strips $b_1$ and $b_2$, the $Z_{INSTR}$ axis, which corresponds to the viewing direction of the instrument 10, points toward the Earth, and the $Y_{INSTR}$ axis is orthogonal to the $X_{INSTR}$ and $Z_{INSTR}$ axes, substantially in the direction of travel of the observation instrument 10, by the vehicle's movement.

A.3) Movement of the Observation Instrument

In the case in which the scanning of a strip's plane of sight is due to the movement of the vehicle, the translation movements of the observation instrument 10 occur because of the vehicle overflying the scene.

These translation movements occur in general at relatively low frequencies and are but little noticeable by the method, particularly when the vehicle is at high altitude. In addition, they are difficult to distinguish from rotation movements of the observation instrument 10.

For this reason, it will be assumed for simplicity that the instrument's translation movements are known with sufficient accuracy and that the aim is above all to reconstruct the rotation movements of the observation instrument 10. It is to be noted, however, as will be seen later, that the method can be easily generalized to estimating the full movement of the instrument, both in translation and in rotation, and that it can extend to estimating the movements of any moving part of the instrument, such as a sighting mirror.

The rotational movements of the observation instrument 10 (which is assumed to be fixed in relation to the vehicle) occur in particular because of the rotation movements of the carrier vehicle, called "gross movements" of the observation instrument 10. These movements are in general estimated with dedicated sensors on board the vehicle, such as e.g. gyroscopes, and stellar sensors if the vehicle is a satellite. However, this estimate is polluted by errors due in particular to measurement errors.

Other movements of the instrument, and more specifically of its line of sight, called "parasitic movements", come from relative displacements in translation and/or in rotation between different optical elements of the instrument (focal plane, mirrors, etc.), due for example to vibrations, these movements affecting the instrument's line of sight. Parasitic movements are much more difficult to measure, because this would require a large number of accelerometers and gyrometers distributed over the entire structure of the observation instrument.

The gross movements and the parasitic movements differ, in general, by their amplitude and frequency spectrum. The gross movements are of the order of a hundredth of a degree to a few degrees, and at relatively low frequencies (from zero to a few Hertz). Parasitic movements are an order of magnitude smaller than gross movements, and at higher frequencies (from a few tens to a few hundred Hertz).

The gross movements of the observation instrument 10 cause rotations of the instrument reference frame $R_{INSTR}$ in relation to a terrestrial reference frame $R_T$ (e.g. the local geographic reference frame at the reference point of the observed scene, not shown in the figures), which reflect the temporal evolution of the instrument's attitude in relation to said reference frame $R_T$.

The parasitic movements cause small rotations expressed in relation to the instrument reference frame $R_{INSTR}$, which break down into rotations about the $Y_{INSTR}$ axis, called "roll rotations", about the $X_{INSTR}$ axis, called "pitch rotations", and about the $Z_{INSTR}$ axis, called "yaw rotations".

It should be noted that errors in the estimation of the gross movements of the observation instrument 10 may appear for small angles in the same way as parasitic movements, in terms of roll, pitch and yaw errors. Thus, the movement of the observation instrument 10 can be described as being the values taken over time of attitude angles (e.g. Euler angles) in relation to a reference frame. Other equivalent formulations based on other angles, quaternions or rotation matrices may be used without this modifying the principle of the invention.

The real movement of the observation instrument 10 at the time of acquisition for index n is designated as $\theta_R(n)$, $1 \leq n \leq N$, e.g. expressed within the terrestrial reference frame $R_T$. As previously seen, this movement is the sum of the gross movements and of the parasitic movements. It should be noted that, in the case in which the scanning of the line of sight is carried out by rotation of a sighting mirror located on the instrument's optical path, the angle or angles of rotation of the mirror are included in the vector $\theta_R(n)$ at any time n, $1 \leq n \leq N$.

The set of all the $\theta_R(n)$, $1 \leq n \leq N$, which represents the real movement of the instrument during image capture is designated by $\Theta_R$.

The estimated movement of the observation instrument 10 at the time of acquisition for index n is designated as $\theta_{EST}(n)$, $1 \leq n \leq N$, expressed within the reference frame $R_T$. The set of all the $\theta_{EST}(n)$, $1 \leq n \leq N$, which represents the estimated movement of the observation instrument 10 during image capture is designated by $\Theta_{EST}$.

A movement hypothesis of the instrument 10 during image capture at acquisition times n is designated by $\Theta = \{\theta(n), 1 \leq n \leq N\}$, expressed within the reference frame $R_T$.

A.4) Geometric Model, Spatio-Temporal Transformation and Matching of the Pixels in the Composite Images A geometric model $R_i^{mod}(k)$ of the instrument is assumed to be known, which associates to the sensitive cell for index value k of the strip $b_i$, its viewing direction expressed within the $R_{INSTR}$ reference frame. This geometric model can also model the optical distortions introduced by the observation instrument 10, which are, for example, estimated by calibration beforehand.

A cartographic reference frame $R_C = (O, X_C, Y_C, Z_C)$ (not shown in the figures) is considered, for example such that $(X_C, Y_C)$ is the tangential plane to the Earth's surface at a reference point O of the observed scene, in which the composite images acquired by the strips can be projected to reconstitute the real image of the overflown scene. The plane $(O, X_C, Y_C)$ will be referred to as "image reference frame" in rest of the description. To simplify the equations, the non-limiting case in which the reference frames $R_T$ and $R_C$ are one and the same is used.

However, it should be noted that other image reference frames could be considered, possibly non-planar, such as e.g. a projection on the terrestrial ellipsoid, onto a known relief model; or one of the composite images acquired by one of the strips that are distorted by the movements of the observation instrument 10.

From a given movement hypothesis $\Theta$ of the instrument, each pixel of the composite image with an index value $q=(k,n)$, acquired by the sensitive cell with index value k of strip $b_i$, at time n can be projected into the image reference frame by calculating the intersection of the line of sight of the pixel with index value $q=(k,n)$ and the plane $(O, X_C, Y_C)$.

To this end, the viewing direction $d_i(k,n)$ of a straight line going past the position M of the instrument 10 and the sensitive cell with index value k at time n within the cartographic reference frame $R_C$ is calculated from the movement hypothesis $\theta(n)$ of the instrument 10 at time n and from the geometric model of the instrument:

$$d_i(k,n) = R_{\theta(n)} \cdot R_i^{mod}(k)$$

where $R_{\theta(n)}$ is a rotation that transforms the instrument reference frame $R_{INSTR}$ in the cartographic reference frame $R_C$. The projection $p=(x,y)$ of the pixel with index value $q=(k,n)$ in the image reference frame $(O, X_C, Y_C)$ corresponds to the intersection of the direction line $d_i(k,n)$ with the plane $(O, X_C, Y_C)$. In this way a transformation $V_i$ is obtained, which according to a movement hypothesis $\theta$, associates a pixel with index value $q=(k,n)$ of the composite image and the point $p=(x,y)$ of the image reference frame, which is the point actually represented by the pixel $B_i(k,n)$:

$$p = V_i(q, \Theta) \tag{1}$$

In this relation (1), the variables are p and q, the movement hypothesis $\Theta$ is considered as a set of parameters on which the transformation $V_i$, $1 \leq i \leq Nb$ depends.

The calculation of the projection can be performed analytically, if the geometric model of the observation instrument 10 is not too complicated. Rays can also be cast in the case of an instrument with a more complex geometric model. A model of the scene's topography can also be used to take into account the differences it introduces.

The position of the pixel with index value (k,n) thus projected into the image reference frame $(O, X_C, Y_C)$ is designated by $p_i^{k,n} = (x_i^{k,n}, y_i^{k,n})$, expressed in meters or in any other unit. The set of projected points $p_i^{k,n}$ of the composite image's pixels in the image reference frame is called "spatio-temporal grid" of the composite image. The composite image that associates the value of the pixel $B_i(k,n)$ to the position $p_i^{k,n}$ is called "image corrected by the movement".

The method requires the calculation of the geometric transformations $W_i$, the inverse of $V_i$, called "spatio-temporal transformations".

Given a movement hypothesis $\Theta$, the spatio-temporal transformations associate, to a point $p=(x,y)$ of the image reference frame in the scene imaged by a strip $b_i$ during image capture, the position q of the pixel in the composite image $B_i$ acquired by strip $b_i$ whose projection within the image reference frame is the point $p=(x,y)$, taking into account the movement hypothesis $\Theta$.

To do this, it must be considered that the movement hypothesis $\Theta=\{\theta(n), 1 \leq n \leq N\}$ is interpolated to non-integer values of time: $\Theta=\{\theta(t), t \text{ real in the interval } [0,(n-1)\cdot\Delta T]\}$, and that the composite image $B_i$ corrected by the movement is also interpolated using any interpolation method known to the man skilled in the art, such as cubic or Shannon truncated interpolation, or interpolation using splines, such that the value of pixels $B_i(\alpha,t)$ for continuous positions $\alpha$ of a virtual sensitive cell along the strip $b_i$, can be defined for a continuous acquisition time t. Considering the point $p=(x,y)$ of the image reference frame, this point can be positioned in relation to the spatio-temporal grid of image $B_i$ corrected by the movement, giving a first full approximation (k',n') of the position of the pixel in the composite image. Real values ($\alpha$,t) are obtained that refine this approximation for example by working on small variations and linearizing the problem. More generally, any method known to the man skilled in the art may be used to invert the transformation $V_i$.

The inverse transformation to $V_i$ will be called $W_i$; it associates any point $p=(x,y)$ of the image reference frame and the position $q=(\alpha,t)$ of the pixel that images this point in the composite image B, given the movement hypothesis $\Theta$:

$$q = W_i(p,\Theta) \quad (2)$$

where the variables p and q can be equal to a non-integer number by interpolation.

The spatio-temporal transformations $W_i$, $1 \leq i \leq Nb$, allows the pixels of the composite images to be matched according to a movement hypothesis $\Theta$, i.e. to determine, for any point p considered in the image reference frame, the pixel values $B_i(W_i(p,\Theta))$, $1 \leq i \leq Nb$, which theoretically represent this point p in the composite images.

Here, "theoretically represent this point", means that the pixels matched actually represent the same point only when the movement hypothesis $\Theta$ considered is equal to the real movement $\Theta_R$. When the movement hypothesis $\Theta$ considered will be very different from the actual movement $\Theta_R$, it can therefore be seen that the matched pixels, although representing the same point in theory, will in practice represent different points of the observed scene, and that the values of these pixels will be weakly correlated.

In the case where the movement hypothesis matches reality ($\Theta=\Theta_R$), there should be, subject to interpolation errors, for any point p in the image reference frame and any i and j, $1 \leq i,j \leq Nb$:

$$B_i(W_i(p,\Theta_R)) = B_j(W_j(p,\Theta_R)) \quad (3)$$

because these two matched pixels of the interpolated composite images correspond to the same point p of the image reference frame.

It can therefore be seen that the coherence of a given movement hypothesis $\Theta$ can be assessed by comparing the matched pixels $B_i(W_i(p,\Theta))$, $1 \leq i \leq Nb$.

It should be noted that the matching of the composite images can be carried out from the spatio-temporal transformation:

$$W_{ji} = W_j \circ = W_i^{-1} = W_j \circ V_i \quad (4)$$

that moves directly from one composite image $B_i$ to another composite image $B_j$. To calculate $W_{ji}$, a pair of strips $b_i$, $b_j$ and a movement hypothesis $\Theta$ are considered. A pixel $q=(k,n)$ of the composite image acquired by the strip $b_i$ is considered. This pixel is projected in the image reference frame according to the movement hypothesis $\Theta$, giving the point $p_i=V_i(q,\Theta)$; the position $q_j=(\alpha,t)$ of the composite image $B_j$ is then calculated, which is projected at $p_i$:

$$q_j = W_j(V_i(q,\Theta)) = W_{ji}(q,\Theta) \quad (5)$$

In all cases, there will be a spatio-temporal transformation that matches the pixels of the composite images $B_i$, $B_j$ obtained by the strips $b_i$, $b_j$. It should be noted that this spatio-temporal transformation also depends on the image reference frame chosen, on the instrument's geometric model and possibly on a terrain model that is introduced to perform the matching.

B) DESCRIPTION OF THE ESTIMATION METHOD

B.1) General Principle of the Estimation Method

According to the invention, the estimated movement is determined by optimization of a function called "image similarity function $F_1$" that associates, to a given movement hypothesis $\Theta$, a similarity between the values of the matched pixels of at least a pair of composite images. As seen previously, matched pixels are pixels that represent, theoretically, the same point of the observed scene, given the considered movement hypothesis.

The method comprises, for each movement hypothesis $\Theta$ considered during the optimization of the image similarity function $F_1$, the following steps:

200 determining, for the at least one pair of composite images, at least one spatio-temporal transformation using the considered movement hypothesis $\Theta$ and a geometric model of the observation instrument 10;

201 matching the pixels of the at least one pair of composite images using the at least one spatio-temporal transformation.

The operations performed during steps 200 and 201 have already been described in section A.4) above.

The image similarity function $F_1$ comprises for example a component $F_{12}$, which takes into account the composite images $B_1$, $B_2$ acquired by the strips $b_1$, $b_2$. The pixels of these composite images are matched either by means of the spatio-temporal transformations $W_1$ and $W_2$, or of the single spatio-temporal transformation $W_{21}$ (or $W_{12}$).

Preferably, an advantageously convex function is chosen as $F_{12}$ component, which increases as a distance between the matrices of the values of the matched pixels of the two composite images $B_1$ and $B_2$ decreases. In this case the optimization consists in determining a movement hypothesis that tends to maximize this component $F_{12}$.

Nevertheless, a concave function could be chosen in an equivalent manner, which decreases as a distance between the matrices of the values of the matched pixels of the two composite images $B_1$ and $B_2$ decreases. In this case the optimization consists in determining the movement hypothesis that tends to minimize this component $F_{12}$.

The distance may be quadratic, linear, in the form of scalar product, with or without pixel-dependent weighting, etc. It should be noted that this is a distance between the values of pixels representing theoretically the same point and not, as described in patent FR 2 899 344, a geometric distance between the positions (indices) of pixels representing effectively the same point (homologous characteristic area) in each of the composite images.

For example, one of the following functions may be selected as the image similarity function:

$$F_{12}(\Theta) = \exp\left(-\sum_{p=(i,j)} \alpha_{ij} \cdot h_1(B_1(W_1(p,\Theta)) - B_2(W_2(p,\Theta)))\right) \quad (6a)$$

$$F_{12}(\Theta) = \sum_{p=(i,j)} \alpha_{ij} \cdot h_1(B_1(W_1(p,\Theta)) - B_2(W_2(p,\Theta))) \quad (6b)$$

where p=(i,j) corresponds to a grid of all or part of the image reference frame area that is imaged by the two strips $b_1$ and $b_2$; $\alpha_{ij}$ are positive or zero weighting coefficients; $h_1$ is a p-norm.

The examples given in expressions (6a) and (6b) are non-limiting. It should be noted that the optimization of the component $F_{12}$ of expression (6a) is a maximization, whereas the optimization of the component $F_{12}$ of expression (6b) is a minimization.

It should be noted that the grid p=(i,j) may be regular, or denser in pre-specified areas of the composite image whose properties are deemed to be more favorable than others for matching and similarity assessment operations.

Another example of an image similarity function may be in the form of scalar product:

$$F_{12}(\Theta) = \sum_{p=(i,j)} \alpha_{ij} \cdot h_1(B_1(W_1(p,\Theta)) \cdot B_2(W_2(p,\Theta))) \quad (7)$$

As indicated previously, the matching could be processed directly from composite image to composite image without going through the image reference frame grid. In this case, the component $F_{12}$ of expression (6a) could be rewritten as follows:

$$F_{12}(\Theta) = \exp\left(-\sum_{p=(k,n)} \alpha_{kn} \cdot h_1(B_1(p) - B_2(W_{21}(p,\Theta)))\right) \quad (8)$$

where, this time, p=(k,n) corresponds to all or part of the indices of the pixels in the composite image $B_1$ in the overlap area of the composite images $B_1$ and $B_2$.

The weighting coefficients $\alpha_{ij}$ can be adjusted individually before optimizing the image similarity function. In addition, these weighting coefficients can be chosen to all be equal, for example equal to one.

It should be noted that the component $F_{12}$ can take other forms. In particular, operators can be introduced to the composite images to account for the fact that they were acquired in different wavelength domains. Such operators are considered to be known to the man skilled in the art, and are not considered here to simplify the expressions and in a manner that is non-limiting to the invention.

A component $F_{12}$ according to the any of the above examples is particularly advantageous because it does not require prior knowledge of the observed scene. In considering this type of image similarity between composite images, prior knowledge of the acquisition system is used, which is that the composite images $B_i$, $1 \le i \le Nb$, represent substantially the same observed scene and can, theoretically, be superimposed (once matched), absent any parasitic movements of the observation instrument 10 (except for those differences related to wavelength domains in the case of a multi-spectral observation instrument 10, interpolation errors, measurement noise, calibration defects, etc.). In addition, this type of component is insensitive to ambiguous textures, such as periodic textures or textures with a strong principal direction (e.g. lines).

More generally, in the case where Nb strips are taken into account, with Nb equal to or greater than three, the image similarity function $F_1$ can easily take into account all or part of the available composite image pairs by accumulating the $F_{ij}$ components of the different pairs of composite images considered. The components $F_{ij}$ are advantageously accumulated by product in the case of components of the type given in expression (6a):

$$F_1(\Theta) = \prod_{i<j} B_{ij} \cdot F_{ij}(\Theta) \quad (9a)$$

or by sum in the case of components of the type given in expression (6b):

$$F_1(\Theta) = \sum_{i<j} B_{ij} \cdot F_{ij}(\Theta) \quad (9b)$$

In this process, the positive weighting coefficients $\beta_{ij}$ may be introduced to reduce the weight of pairs of composite images taken in different wavelengths, such that the similarity between the values of the matched pixels of these composite images is less reliable.

Taking simultaneously into account the image lines acquired by all the strips considered will in general improve the robustness of the method in relation to the state of the art, in the presence of weakly textured areas, especially if the image lines are acquired in different wavelength domains.

Figure 2:
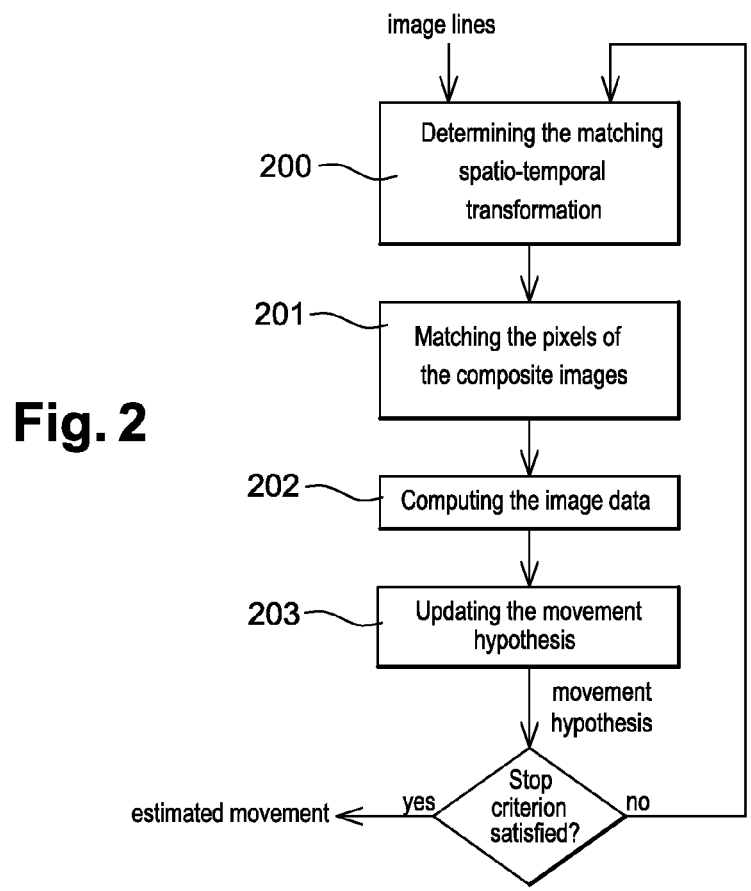

FIG. 2 shows schematically a preferred embodiment of the estimation method, in which the optimization of similarity function $F_1$ is iterative, by iterating the following steps until a stop criterion is satisfied:
  200 determining the spatio-temporal transformations $W_i$ or $W_{ij}$, for each of the composite images pairs considered, using the movement hypothesis $\Theta^k$ of the current iteration k,
  201 matching the pixels of the composite image pairs considered, using the spatio-temporal transformations determined in step 200,
  202 computing, for the image similarity function $F_1$, image data useful to perform the optimization,
  203 updating the movement hypothesis for the next iteration using the image data.

The movement hypothesis $\Theta^1$ considered in the first iteration corresponds for example to the ideal movement of the observation instrument 10 as it would be if the orders sent to the vehicle's attitude control system were perfectly respected and absent any parasitic movements during the acquisition. According to another non-limiting example, the movement hypothesis $\Theta^1$ is a first estimate of the movement of the observation instrument 10, determined for example according to dedicated sensors (attitude sensors), which are different from the observation instrument 10.

The operations performed during steps 200 and 201 have already been described in section A.4) above.

In the image data computation step 202, the value of the image similarity function $F_1$ is determined, for example, using the movement hypothesis $\Theta^k$ of the current iteration k.

Preferably, in the image data computation step 202, one or several gradients of the image similarity function $F_1$ are determined. Such a gradient is determined, for example, by calculating the value of the function $F_1$ for the movement hypotheses $\Theta^k$ and $\Theta^k+\delta\Theta^k$, where $\delta\Theta^k$ is a variation, having a low norm, of the movement hypothesis. These gradients provide information on the direction in which the movement hypothesis $\Theta^k$ is to change to optimize the image similarity function $F_1$.

In the updating step 203, the movement hypothesis $\Theta^{k+1}$ is determined, for example, using the movement hypothesis $\Theta^k$, to which is added an update term $\Delta\Theta^k$ which is determined from the image data. $\Delta\Theta^k$ is, for example, a gradient calculated in step 202, to optimize the image similarity function $F_1$.

If the stop criterion is satisfied, the estimated movement $\Theta_{EST}$ corresponds either to movement hypothesis $\Theta^k$ or to movement hypothesis $\Theta^{k+1}$.

For example, the stop criterion is satisfied when the norm of the update term $\Delta\Theta^k$ is lower than a predetermined threshold. It can be seen that this is a non-limiting example of the invention, and that any other suitable criterion known to the man skilled in the art may be implemented in the estimation method.

B.2) Description of Particular Embodiments of the Method Taking External Measures into Account In a particular embodiment of the estimation method, compatible with any one of the embodiments previously described, the estimated movement is also determined by optimizing a function $F_2$, called "of external similarity".

The external similarity function $F_2$ associates, to a given movement hypothesis $\Theta$, a similarity between said movement hypothesis and measurements representative of the movements of the observation instrument 10; said measurements are carried out by one or several sensors, different from said observation instrument's strips. These sensors are called "external sensors" in the remainder of the description.

Because of the determination of the estimated movement taking into account the measurements by the observation instrument 10 (in the image similarity function $F_1$) and of the measurements by one or several external sensors (external similarity function $F_2$), the estimation method becomes more robust to the nature of the observed scene, inasmuch as the presence of a weakly textured area (sea/ocean, cloud, snowy mountain, etc.) would only be disadvantageous, in terms of robustness, to the optimization in relation to the image similarity function $F_1$.

Preferably, at least one external sensor is a gyroscope or a stellar sensor (sometimes called "star tracker"), on board the same vehicle as the observation instrument 10.

In addition to or as an alternative, when the scanning of the line of sight is obtained by means of sighting mirrors, at least one external sensor is an angular sensor measuring the movement of these scanning mirrors; these mirrors' movements are included in the vector $\theta_R(n)$, for $1 \leq n \leq N$ and are part of said movements of the instrument to be estimated.

According to further examples, it is possible to use data from the composite image acquired by the strips, such as, for example, the known position in the cartographic reference frame $R_C$ of particular and remarkable elements in the composite image, commonly called beacons or control points in the composite image.

In the remainder of the description, the non-limiting case of measurements of the movement obtained by a gyroscope and a stellar sensor is used.

The measurements taken by a stellar sensor are absolute measurements that may, for example, be expressed in the following form:

$$y_{ST}(n)=\theta_R(n)+\epsilon_{ST}(n), 1 \leq n \leq N \quad (10)$$

where $\epsilon_{ST}$ designates a measurement noise, which is generally a colored noise. The vector comprising the set $\{y_{ST}(n), 1 \leq n \leq N\}$ is designated $Y_{ST}$ and the vector comprising the set $\{\epsilon_{ST}(n), 1 \leq n \leq N\}$ is designated $E_{ST}$.

The expression (10) may also be expressed in the form:

$$M_{ST}Y_{ST}=M_{ST}\Theta_R+M_{ST}E_{ST} \quad (11)$$

where $M_{ST}$ is a measurement noise whitening operator $E_{ST}$, such that $M_{ST} \cdot E_{ST}$ has substantially the characteristics of a white noise.

The measurements made by a gyroscope are differential measurements which may for example be expressed in the following form:

$$y_G(n)=\theta_R(n)-\theta_R(n-1)+\epsilon_G(n), 2 \leq n \leq N \quad (12)$$

where $\epsilon_G$ designates a white measurement noise. The vector comprising the set $\{y_G(n), 2 \leq n \leq N\}$ is designated $Y_G$ and the vector comprising the set $\{\epsilon_G(n), 1 \leq n \leq N\}$ is designated $E_G$.

The expression (12) may also be expressed in the form:

$$Y_G=M_G \cdot \Theta_R+E_G(n) \quad (13)$$

where $M_G$ is a convolution operator associated with the filter having $[1,-1]$ as its impulse response.

The external similarity function $F_2$, in the case of a stellar sensor and of a gyroscope, is preferably expressed in the following form:

$$F_2(\Theta)\exp(-h_2(M_{ST}(Y_{ST}-\Theta))-h_3(Y_G-M_G \cdot \Theta)) \quad (14)$$

where $h_2$ and $h_3$ are p-norms.

Other forms of the external similarity function $F_2$ are possible, and frequency weighting coefficients can be introduced for example, taken into account the bandwidth of the various external sensors.

Preferably, the image similarity function $F_1$ of and the external similarity function $F_2$ are optimized jointly. For example, a global function $F$, cumulating said image similarity function and said external similarity function is optimized.

This does not preclude the implementation of optimization schemes other than a joint optimization of the image similarity $F_1$ and external similarity $F_2$ functions. According to another example, the movement hypothesis $\Theta$ that optimizes the function $F_1$ is determined, then function $F_2$ is optimized using this movement hypothesis. This alternating optimization of the functions $F_1$ and $F_2$ may, in addition, be iterated several times. According to yet another example, during an iterative optimization process, for example by the gradient method, a function $F_1$ or $F_2$, which is different from one iteration to another is considered, i.e. by alternating from one iteration to another, the function $F_1$ or $F_2$ whose gradient is to be calculated.

For a joint optimization, a global function F, advantageously takes the form of a sum, possibly weighted, of the functions $F_1$ and $F_2$. According to other examples, the overall function F may take the form of a product of the functions $F_1$ and $F_2$. Note that, by taking the antilogarithm of a product of functions $F_1$ and $F_2$, a global function is obtained, in a manner equivalent for the invention, in the form of a sum of the logarithms of functions $F_1$ and $F_2$.

Examples of global functions F combining the functions $F_1$ and $F_2$ can be expressed as follows:

$$F(\Theta) = \exp\left(-\sum_{i<j}\sum_{p=(i,j)} \alpha_{ij} \cdot h_1(B_1(W_1(p,\Theta)) - B_2(W_2(p,\Theta)))\right) \times \quad (15a)$$
$$\exp(-h_2(M_{ST} \cdot (Y_{ST} - \Theta)) - h_3(Y_G - M_G \cdot \Theta))$$

$$F(\Theta) = \sum_{i<j}\sum_{p=(i,j)} \alpha_{ij} \cdot h_1(B_1(W_1(p,\Theta)) - B_2(W_2(p,\Theta))) + \quad (15b)$$
$$h_2(M_{ST} \cdot (Y_{ST} - \Theta)) + h_3(Y_G - M_G \cdot \Theta)$$

If, for example, the distances $h_1$, $h_2$ and $h_3$ are all in the form of the square of an Euclidean norm, designated $\|\cdot\|^2$, the estimated movement $\Theta_{EST}$ can be determined as follows:

$$\Theta_{EST} = \underset{\Theta}{\mathrm{argmin}}\left(\sum_{i<j}\sum_{p=(i,j)} \alpha_{ij} \cdot \|B_1(W_1(p,\Theta)) - B_2(W_2(p,\Theta))\|^2 + \quad (16)$$
$$\|M_{ST} \cdot (Y_{ST} - \Theta)\|^2 + \|Y_G - M_G \cdot \Theta\|^2\right)$$

Figure 3:
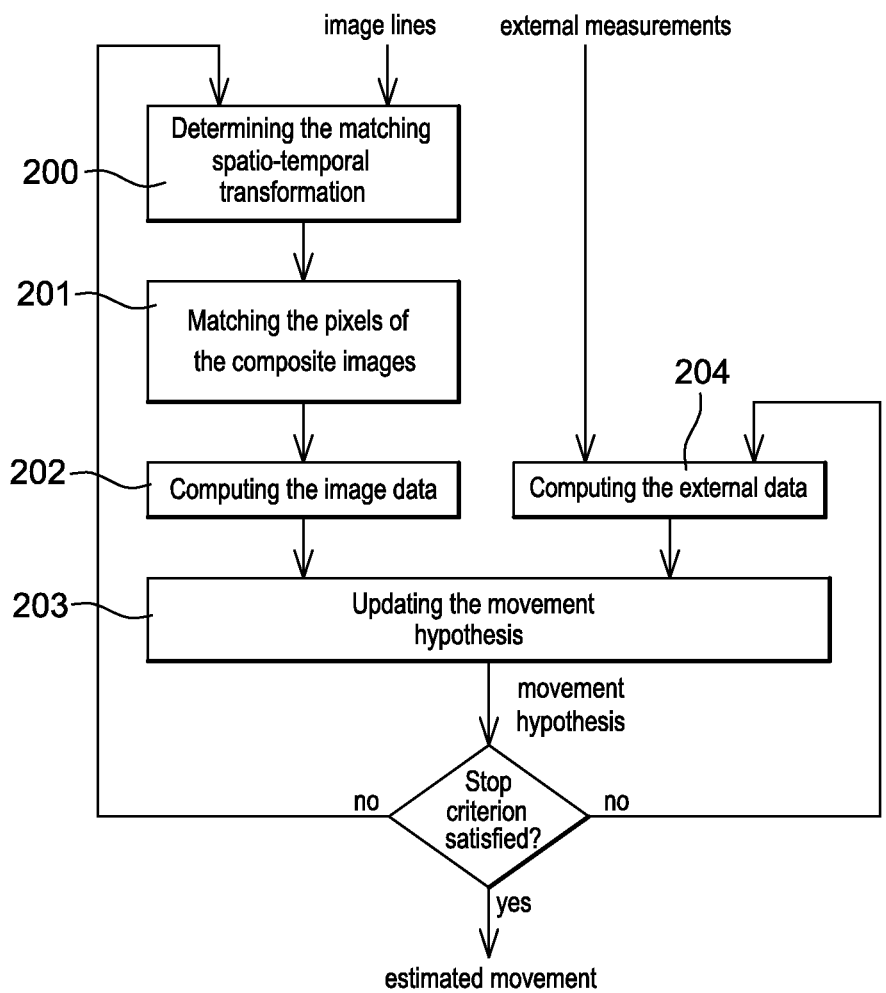

FIG. 3 shows an example embodiment in which the estimated movement $\Theta_{EST}$ is determined iteratively by taking into account the measurements taken by the external sensors and by optimizing, at the same time, the image similarity function $F_1$ and the external similarity function $F_2$.

This example comprises, in addition to the steps already described with reference to FIG. 2, a step 204 in which data, called "external data", are calculated using the external measurements realized by the external sensors. In the movement hypothesis updating step 203, the movement hypothesis $\Theta^{k+1}$ for the next iteration (k+1) is determined using the image data and said external data.

In the external data computation step 204, the value of the external similarity function $F_2$ is for example determined using the movement hypothesis $\Theta^k$ of the current iteration k and using the measurements taken by the external sensors.

Preferably, in the external data computation step 204, one or several gradients of the external similarity function $F_2$ are determined so as to have information on the direction in which the movement hypothesis $\Theta^k$ of the current iteration k is to change to optimize the external similarity function $F_2$.

In the estimated movement updating step 203, the image data and the external data are taken into account either cumulatively (taking into account all the image and external data for each iteration k), or alternately (taking into account the image data at step k of the method and the external data at step k+1). The movement hypothesis $\Theta^{k+1}$ for iteration (k+1) is, for example, determined using the movement hypothesis $\Theta^k$, to which an updating term $\Delta\Theta^k$ is added, which is determined from the image data and the external data.

Preferably, in a cumulative embodiment, the updating term $\Delta\Theta^k$ is a weighted sum of the gradients calculated in steps 202 and 204; said gradients are weighted, for example, by the values respectively of the image similarity function $F_1$ and of the external similarity function $F_2$.

In an alternated embodiment, the updating term will be, alternately, the gradient term corresponding to the image similarity function $F_1$ and the gradient term corresponding to the external similarity function $F_2$.

Taking a Movement Model into Account

In a particular embodiment, which is compatible with any of the embodiments described previously, the movement of the observation instrument 10 is deemed to follow a model, called "movement model".

The movement of the observation instrument 10 is continuous over time, of generally vibratory type, such that the movements $\theta(n)$ are correlated from one acquisition time to another.

Using a movement model bounds the search for the estimated movement, such that the number of unknowns to be determined is generally less than the total number of parameters $\theta(n)$, $1 \le n \le N$ to be estimated, absent a movement model, equal to 3N (roll, pitch, yaw).

Another advantage is to allow the frequency content of the estimated movement to be bounded thereby, especially if the aim is more specifically to estimate the parasitic movements, whose spectrum, as has been seen, is generally from a few tens to a few hundred Hertz.

According to a first example, the movement model is parametric, i.e. it is described by a limited set of parameters.

Preferably, the parametric movement model uses linear combinations of basic functions, which may be of polynomial-, wavelet-, sinusoid-, spline-type, etc. Such a movement model is expressed, for example for the roll angles $\phi(n)$, in the following form:

$$\varphi(n) = \sum_{m=0}^{M-1} \lambda_m \cdot \mu_m(n) \cdot \omega_m(n),\ 1 \le n \le N \quad (17)$$

an expression in which the parameters of the parametric movement model are the following:

M is the order of the parametric movement model,
$\omega_m(n)$, $0 \le m \le M-1$, are the basic functions,
$\mu_m(n)$, $0 \le m \le M-1$, are the coefficients that adapt the movement model locally during the acquisition moments,
$\lambda_m$ are scalar coefficients.

The movement models for the pitch $\alpha(n)$ and yaw $\psi(n)$ angles follow the same format as that given to expression (17), with the parameters possibly being different.

According to another example, the movement model is probabilistic. Preferably, it is an autoregressive movement model, expressed, for example, in the following form:

$$\theta(n) = \sum_{l=1}^{L} a_l \cdot \theta(n-l) + e(n),\ 1 \le n \le N \quad (18)$$

an expression in which the parameters of the autoregressive movement model are the following:

L is the order of the autoregressive movement model,
$a_l$, $1 \le l \le L$, are the coefficients of the autoregressive movement model,
e(n) is the realization of a vector of Gaussian white noise of the same dimension as $\theta(n)$.

The movement model can be taken into account in the estimation method according to different methods.

According to a first example embodiment, in the spatio-temporal transformation $W_i(p,\Theta)$, all the parameters $\theta(n)$ (roll angles $\phi(n)$, pitch angles $\alpha(n)$ and yaw angles $\psi(n)$) are replaced by their parametric movement model of the type given in expression (17). The estimated movement is then determined directly, not by calculating all the angular values $\theta(n)$, but by calculating the parameters $\lambda_m$ of the movement model, which optimize the image similarity function $F_1$ and possible the external similarity function $F_2$.

In an alternative solution, the estimated movement is determined by optimizing a function, called "model similarity function $F_3$". The model similarity function $F_3$ associates, to given movement hypothesis, a similarity between said given movement hypothesis and the movement model.

In the case of a parametric movement model of the type given in expression (17), the model similarity function $F_3$ for roll $\phi(n)$ is expressed, for example, in the form:

$$F_3(\varphi) = \exp\left(-\sum_n h_4\left(\varphi(n) - \sum_{m=0}^{M-1} \lambda_m \cdot \mu_m(n) \cdot \omega_m(n)\right)\right) \quad (19)$$

where $h_4$ is a p-norm. The identical components related to the other angles of pitch and yaw are combined by multiplication in this case.

In the case of a probabilistic movement model of the type given in expression (18), the model similarity function $F_3$ will be written, for example:

$$F_3(\Theta) = \exp\left(-\sum_n h_4\left(\theta(n) - \sum_{l=0}^{L-1} a_l \cdot \theta(n-l)\right)\right) \quad (20)$$

where $h_4$ is a p-norm.

The optimization of the image similarity function $F_3$ may be performed jointly with the optimization of the image similarity function $F_1$, using a global function F, cumulating said image similarity function and said model similarity function. Preferably, the global function F also includes the external similarity function $F_2$ and the optimization is performed jointly for the three functions $F_1$, $F_2$ and $F_3$.

According to another example, the movement hypothesis $\Theta$ that optimizes the image similarity function $F_1$ or a global function F that cumulates the image similarity function $F_1$, the external similarity function $F_2$ or a global function F that cumulates the three functions $F_1$, $F_2$ and $F_3$ (with the model's parameters being set), is calculated, then, given this movement hypothesis, the parameters of the (parametric or probabilistic) model that optimizes the model similarity function $F_3$ is calculated for this movement hypothesis. This alternating optimization can be iterated several times.

Figure 4:
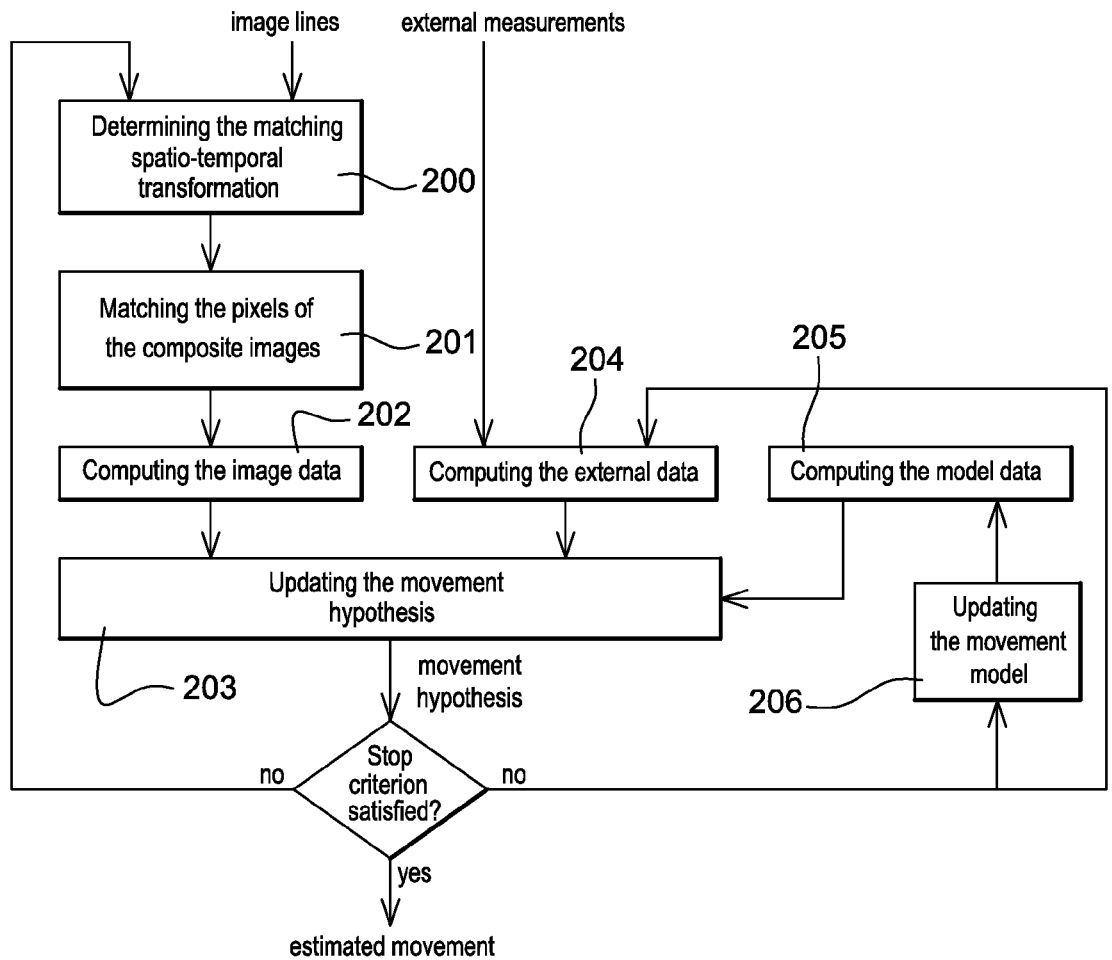

FIG. 4 shows a particular embodiment of the method in which the estimated movement $\Theta_{EST}$ is determined iteratively by taking into account the composite images, the measurements taken by the external sensors and a probabilistic movement model.

In addition to the steps described above with reference to FIG. 3, the estimation method also comprises the following steps:
205 computing data called "model data" using a temporal movement model and the movement hypothesis $\Theta^k$ of the current iteration k,
203 updating the movement hypothesis for the next iteration using the model data.

In step 205, the model data, which corresponds for example to the value of the model similarity function $F_3$, is calculated. Preferably, in the model data calculation step 205, one or several gradients of the model similarity function F3 are determined, so as to have information on the direction in which the movement hypothesis $\Theta^k$ of the current iteration k is to change to optimize the model similarity function $F_3$.

The model data is preferentially used in the movement hypothesis updating step 203, as described previously for taking external data into account.

Preferably, the method comprises a step 206 of updating the movement model based on the movement hypothesis $\Theta^{k+1}$ for the following iteration (k+1). In this step 206, the movement model is updated using the movement hypothesis $\Theta^{k+1}$ of iteration (k+1). This update is an estimate of a new movement model, for example an estimate in terms of maximum likelihood, least squares, a posteriori maximum, etc.

Masking of Matched Pixels

In a particular embodiment of the method, compatible with any one of the embodiments previously described, masking of the matched pixels whose similarity evolves, during optimization, in abnormal fashion in relation to the similarity of the other matched pixels is implemented.

Here, "masking" means that the contributions of said pixels whose similarity evolves in abnormal fashion are decreased, in the image similarity function $F_1$, in relation to the contributions of the other pixels.

The matched pixels whose image similarity evolves in abnormal fashion are, for example, matched pixels whose values differ significantly, in particular, whose differences are significantly greater than those statistically seen, on average, over all the pixels. In other words, the matched pixels whose similarity evolves in an abnormal way correspond to measurements that appear as outliers, taking into account the available measurements.

Such outliers are generally linked to the presence of clouds, to the effects of parallax due to the uncertainties on the terrain due to the fact that the lines of sight of the strips are different, to differences in acquisition wavelength domains, to incorrect relief data taken into account, etc.

The masking of matched pixels whose image similarity evolves in an abnormal way is, for example, carried out by considering a robust estimation function $h_1$ for the image similarity function $F_1$. Such robust estimation functions, for example an M-estimator, are known to the man skilled in the art.

According to another non-limiting example, a weighting matrix $M_P$ of the pixels in the composite images is determined. The weighting matrix preferentially has the same dimension as the composite images. Some elements of the weighting matrix may have a null value (e.g. outside the overlapping areas of the composite image). It is implemented, for example, as follows:

$$F_1(\Theta) = \exp\left(-\sum_{i<j}\sum_p h_1(M_P(p) \cdot (B_i(W_i(p, \Theta)) - B_j(W_j(p, \Theta))))\right) \quad (21)$$

where $M_P(p)$ is the weighting coefficient associated with point p.

Figure 5:
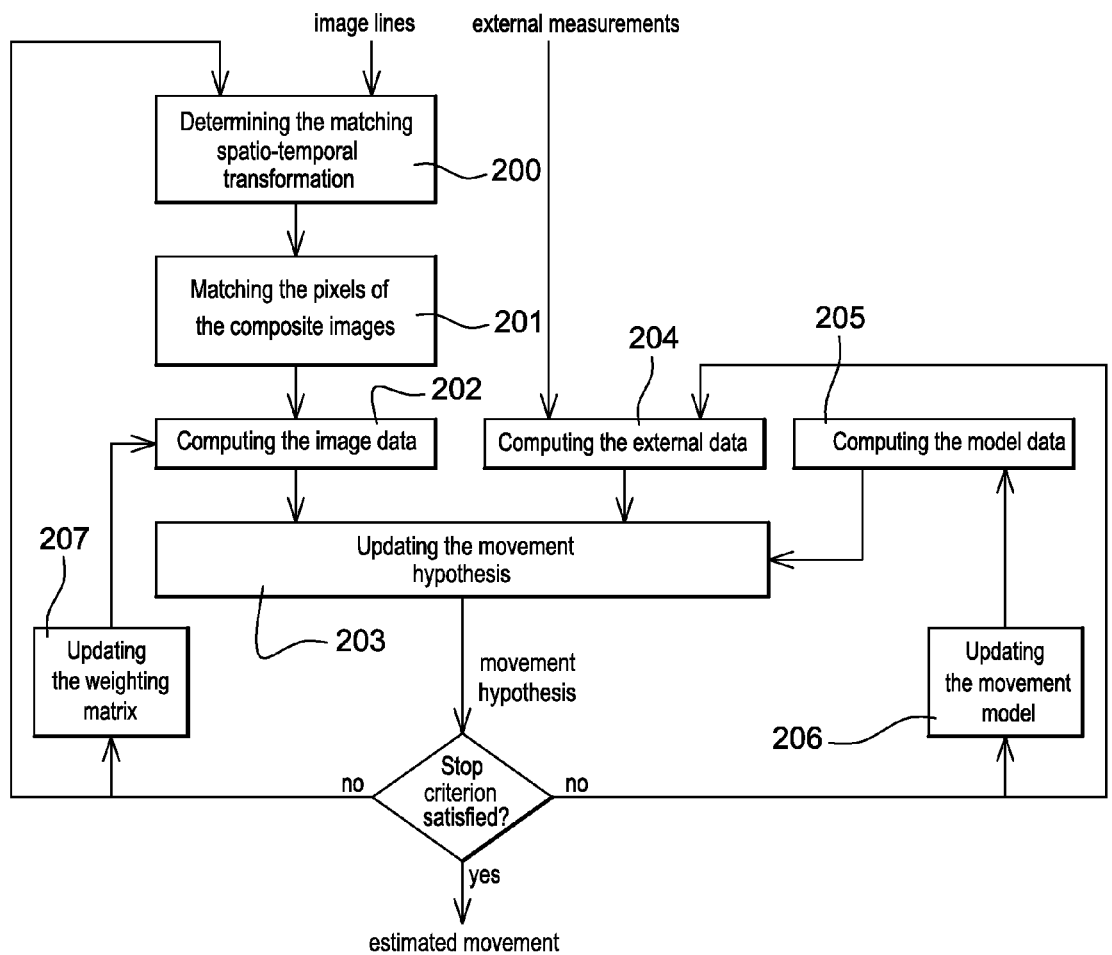

FIG. 5 shows a particular embodiment of masking by weighting matrix in the case where the estimated movement is determined iteratively by taking into account the composite images, the measurements taken by the external sensors and a probabilistic movement model.

In addition to the steps described with reference to FIG. 4, the estimation method also comprises a step 207 in which the weighting matrix $M^k_P$ for the current iteration k is updated, using the movement hypothesis $\Theta^{k+1}$, during which step 207, the weighting matrix $M^{k+1}_P$ is determined for the next iteration (k+1).

Preferably, the elements of the weighting matrix $M^{k+1}_P$ are calculated using the differences between the value of the matched pixels according to the movement hypothesis $\Theta^{k+1}$, i.e. using the differences $B_1(W_1(p,\Theta^{k+1}))-B_2(W_2(p,\Theta^{k+1}))$.

To set the weighting coefficients, for example, the distribution of matched pixel differences by value intervals can be calculated, by determining, for each interval, the number of pixels pairs whose difference is in this interval, then, the weighting coefficients of the matrix $M^{k+1}_P$ are determined for each pixel as being the ratio between the number of occurrences corresponding to the interval in which the pixel is located and the total number of pixels in the images.

It should be noted that the same weighting matrix can be used for all pairs of composite images, or a weighting matrix can be determined for each pair, according to the composite images of the pair.

Multi-Resolution Optimization Scheme

In another particular embodiment of the estimation method, compatible with any one of the embodiments previously described, said estimation method is iterated according to a multi-resolution optimization scheme.

In other words, in a first iteration of the estimation method, a first subset of pixels of the composite images is considered and a first estimated movement for this first sub-set is determined.

In a second iteration of the method, a second subset of pixels of the composite images, which comprises more pixels than the first subset, is considered, adjusted by the first estimated movement, and a second estimated movement is determined.

The estimation method is iterated by progressively increasing the number of pixels in the subset considered, until the final subset is reached, which may correspond to the all the pixels of the composite images, at least in overlap area.

It is expected, by iterating the estimation method according to a multi-resolution optimization scheme, that the accuracy of the estimated movement will be improved and/or that the convergence of the estimation method towards an estimated movement that satisfies the stop criterion will be accelerated.

C) FURTHER COMMENTS, GENERALIZATIONS

More generally, the scope of the present invention is not limited to the embodiments considered above as non-limiting examples, but on the contrary extends to modifications in the reach of the man skilled in the art.

In particular, determining the estimated movement $\Theta_{EST}$ by optimization of the image function $F_1$ and possibly of the external similarity function $F_2$ and/or of the model similarity function $F_3$, can implement any optimization method known to the man skilled in the art.

The method can be applied to any form of strips, possibly other than linear, for example discontinuous linear, V-shaped, or any other geometric shape, as long as there exists an overlap between the composite images of at least two strips during an image capture and that it is possible to express a geometric model of the observation instrument 10 in the instrument reference frame $R_{INSTR}$.

It should be noted that the sensitive cells of the strips $b_1$ to $b_{Nb}$ can be arranged in several rows, the number of sensitive cells per row being, however, greater at least by a factor of ten than the number of rows. It can therefore be seen that the images lines acquired by the different strips are also in this case formed of a plurality of rows of pixels. This invention is not modified, to the extent that the composite images are formed from image lines acquired at different times, said images lines representing different parts of the observed scene on the surface of the Earth.

In addition, nothing precludes the strips from being rows of sensitive cells of a single sensor in the form of a two-dimensional matrix of sensitive cells, as long as they realize the acquisition of a single point of the observed scene at different times. Nor does anything preclude considering strips that are arranged, not at the focal plane of a single instrument, but at the focal plane of at least two different instruments whose lines of sight are close. Note that everything that has been described remains valid if "instrument" designates the set of at least two instruments and "line of sight of the instrument" designates a line of sight, possibly fictitious, in relation to which the lines of sight of the at least two instruments are deduced from a geometric model of all the instruments.

It is also noted that using all the composite images and in particular all the pairs of composite images in the image similarity function $F_1$ constitutes a preferred non-limiting embodiment of the invention.

According to another example, only those image lines acquired by strips $b_1$ and $b_{Nb}$ are used, i.e. the most widely spaced strips at the focal plane of the observation instrument 10. If there are acquisition times for which there is no image line acquired by one or both strips $b_1$ and $b_{Nb}$, the estimated movement is for example interpolated for said acquisition times, or bounded by the temporal movement model, be it parametric or probabilistic.

According to yet another example, all the composite images are used, but only a subset of all the possible pairs of composite images are considered, preferably a subset in which each composite image is used at least once.

In addition to the rotational movements of the instrument, the translation movements of the observation instrument 10 can be introduced in the movement to be estimated. It requires only increasing the rotational movement hypothesis vector $\Theta$ in a vector $(X,\Theta)$ where X is the translation movement hypothesis over time, and expressing the spatio-temporal transformations and the similarity functions $F_1$, $F_2$ and $F_3$ according to $(X,\Theta)$, then calculating the movement hypothesis $(X,\Theta)$ that maximizes the similarity functions.

In the case where the translation movements are introduced among the variables to be estimated, it is advantageous to consider external measurements taken by an external sensor such as a satellite navigation receiver, an inertial measurement unit, or any other sensor able to provide an estimate of the position of the vehicle in the terrestrial reference frame $R_T$, and to process these external measurements in the external similarity function $F_2$, as described for rotational movements.

The invention claimed is:

1. A method for estimating the movement of an observation instrument on-board a vehicle flying over a celestial body, the observation instrument comprising at least two strips with different lines of sight, each strip realizing the acquisition of successive image lines making up a composite image, by scanning its line of sight over the celestial body, parts of the composite images representing substantially a same scene of the celestial body, wherein the estimated movement is determined by searching a movement hypothesis that optimizes a global function, the value of the global function, obtained for a given movement hypothesis, cumulating the respective values of an image similarity function and of an external similarity function calculated for said given movement hypothesis:

the value of said image similarity function corresponds to a similarity between values of matched pixels of at least a pair of composite images, matched pixels being pixels that represent, theoretically, the same point of the observed scene, given said given movement hypothesis, and the value of said external similarity function corresponds to a similarity between said given movement hypothesis and measurements of the observation instrument's movements, made by one or several sensors different from the observation instrument's strips, the method comprising, for calculating the value of the image similarity function for each movement hypothesis considered during the optimization of the global function, the following steps:

determining, for the at least one pair of composite images, at least one spatio-temporal transformation using the considered movement hypothesis and a geometric model of the observation instrument; and matching the pixels of the at least one pair of composite images using the at least one spatio-temporal transformation.

2. Method according to claim 1, wherein the global function is optimized iteratively by iterating the following steps until a stop criterion is satisfied:

determining the at least one spatio-temporal transformation of the at least one pair of composite images using the movement hypothesis of the current iteration;

matching the pixels of the at least one pair of composite images;

computing image data using said matched pixels, for the image similarity function; and updating the movement hypothesis for the next iteration using the image data.

3. The method according to claim 2, wherein the image data comprises at least one gradient of the image similarity function that is representative, around the current iteration's movement hypothesis, of the variation of the similarity between the values of the matched pixels of the at least one pair of composite images.

4. The method according to claim 1, wherein the external similarity function is optimized iteratively by iterating the following steps until a stop criterion is satisfied:

computing, for the external similarity function, external data using the measurements of the sensor or sensors and the current iteration's movement hypothesis; and updating the movement hypothesis for the next iteration using the external data.

5. The method according to claim 4, wherein the external data comprises at least one gradient of the external similarity function that is representative, around this movement hypothesis, of the variation of the similarity between the current iteration's movement hypothesis and the measurements of the sensor or sensors.

6. The method according to claim 1, wherein at least one sensor is a gyroscope or a stellar sensor or an angular sensor of a movable mirror of the observation instrument.

7. The method according to claim 1, wherein the estimated movement is determined using a predefined temporal model of the observation instrument's movements.

8. The method according to claim 7, wherein the estimated movement is determined by optimization of a model similarity function that associates, to a given movement hypothesis, a similarity between said movement hypothesis and the temporal movement model.

9. The method according to claim 8, further comprising a step of updating the temporal movement model using a movement hypothesis.

10. The method according to claim 8, wherein the model similarity function is optimized iteratively by iterating the following steps until a stop criterion is satisfied:

computing, for the model similarity function, model data using the temporal movement model and the current iteration's movement hypothesis;

updating the movement hypothesis for the next iteration using the model data.

11. The method according to claim 10, wherein the model data comprises at least one gradient of the model similarity function that is representative, around this movement hypothesis, of the variation in similarity between the current iteration's movement hypothesis and the temporal movement model.

12. The method according to claim 8, wherein the image similarity function, the external similarity function and the model similarity functions are optimized jointly, the global function cumulating said image similarity function, said external similarity function and said model similarity function.

13. The method according to claim 7, wherein the temporal movement model is a parametric movement model, preferably a model whose basic functions are of polynomial, wavelet, sinusoid, or spline.

14. The method according to claim 7, wherein the temporal movement model is a probabilistic movement model or an autoregressive model.

15. The method according to claim 1, wherein in the image similarity function, matched pixels whose similarity evolves, during optimization, in abnormal fashion in relation to the similarity of the other matched pixels have their contributions reduced.

16. The method according to claim 15, wherein the reduction of the contributions of matched pixels is performed by means of a M-estimator.

17. The method according to claim 15, wherein the reduction of the contributions of matched pixels is performed by means of at least one weighting matrix.

18. The method according to claim 17, comprising, where the image similarity function is optimized iteratively, a step of updating the at least one weighting matrix using the contributions of the matched pixels to said image similarity function.

19. The method according to claim 1, wherein the image similarity function is expressed as one of the following:

$$F_{12}(\Theta) = \exp\left(-\sum_{p=(i,j)} \alpha_{ij} \cdot h_1(B_1(W_1(p, \Theta)) - B_2(W_2(p, \Theta)))\right)$$

or $$F_{12}(\Theta) = \sum_{p=(i,j)} \alpha_{ij} \cdot h_1(B_1(W_1(p, \Theta)) - B_2(W_2(p, \Theta)))$$

where p=(i,j) corresponds to a grid of all or part of the image reference frame area that is imaged by the at least two strips; $\alpha_{ij}$ are positive or zero weighting coefficients; $h_1$ is a p-norm; $B_1, B_2$ are composite images acquired by the at least two strips; and the pixels of these composite images are matched either by means of the spatio-temporal transformations $W_1$ and $W_2$.

20. The method according to claim 1, wherein the image similarity function is expressed as a scalar product:

$$F_{12}(\Theta) = \sum_{p=(i,j)} \alpha_{ij} \cdot h_1(B_1(W_1(p, \Theta)) \cdot B_2(W_2(p, \Theta)))$$

where p=(i,j) corresponds to a grid of all or part of the image reference frame area that is imaged by the at least two strips; $\alpha_{ij}$ are positive or zero weighting coefficients; $h_1$ is a p-norm; $B_1, B_2$ are composite images acquired by the at least two strips; and the pixels of these composite images are matched either by means of the spatio-temporal transformations $W_1$ and $W_2$.

* * * * *